(12) United States Patent
Matoba (10) Patent No.: US 7,550,214 B2
(45) Date of Patent: Jun. 23, 2009

(54) FUEL CELL SYSTEM AND FUEL CELL OPERATING METHOD

(75) Inventor: Tadashi Matoba, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 926 days.

(21) Appl. No.: 10/520,518

(22) PCT Filed: Jan. 30, 2004

(86) PCT No.: PCT/JP2004/000954

§ 371 (c)(1),
(2), (4) Date: Jan. 7, 2005

(87) PCT Pub. No.: WO2004/075327

PCT Pub. Date: Sep. 2, 2004

(65) Prior Publication Data

US 2005/0255352 A1    Nov. 17, 2005

(30) Foreign Application Priority Data

Feb. 19, 2003  (JP)  ............................. 2003-041147

(51) Int. Cl.
*H01M 8/04* (2006.01)
(52) U.S. Cl. ............................. 429/13; 429/22; 429/24; 429/25
(58) Field of Classification Search .................. None
See application file for complete search history.

(56) References Cited

U.S. PATENT DOCUMENTS

| 2001/0014414 A1 | 8/2001 | Okamoto et al. |
| 2002/0094469 A1 | 7/2002 | Yoshizumi et al. |
| 2002/0177016 A1* | 11/2002 | Okamoto ............... 429/20 |

FOREIGN PATENT DOCUMENTS

| EP | 1 248 312 A2 | 10/2002 |
| JP | 61-260553 A | 11/1986 |
| JP | 1-186761 A | 7/1989 |
| JP | 07-078626 A | 3/1995 |
| JP | 2001-229941 A | 8/2001 |
| JP | 2002-289237 A | 10/2002 |
| WO | WO 03/052846 * | 6/2003 |
| WO | WO 2004/045004 A2 | 5/2004 |

* cited by examiner

*Primary Examiner*—Jonathan Crepeau
(74) *Attorney, Agent, or Firm*—Foley & Lardner LLP (57) ABSTRACT

A fuel cell system and related method are disclosed having a catalytic combustor 7 combusting mixed gas between fuel gas, or anode off-gas, and oxidant gas or cathode off-gas, and a system controller 35 operative to perform control such that during at least an ignition period until the catalytic combustor is discriminated to be sufficiently activated from commencement of supplying the mixed gas to the catalytic combustor, a fuel gas concentration of the mixed gas is maintained in a given range (greater than a catalyst activation lower limit and less than flammable lean-limit) whereas after the ignition period has been elapsed, the mixed gas is supplied to the catalytic combustor even if the fuel gas concentration lying at a value deviated from the given range.

14 Claims, 7 Drawing Sheets

FUEL CELL SYSTEM AND FUEL CELL OPERATING METHOD

TECHNICAL FIELD

This invention relates to fuel cell systems and, more particularly, to a fuel cell system which has an improved combustion characteristic of anode off-gas, and a related method.

BACKGROUND ART

A fuel cell system serves to electrochemically react fuel gas, such as hydrogen gas, and oxidant gas containing oxygen to one another to allow an electric energy to be taken out from electrodes disposed on both sides of an electrolyte membrane. Especially, a solid polymer fuel cell employing a solid electrolyte attracts public attention as an electric power supply for an electric vehicle because of a low operating temperature and ease of handling. That is, a fuel cell powered vehicle is an ultimate clean vehicle on which a hydrogen absorbing device, such as a high pressure hydrogen tank, a liquid hydrogen tank and a hydrogen absorbing amorphous alloy tank, is installed to allow hydrogen, supplied from the same, and air including oxygen to be delivered to the fuel cell to accomplish reaction for taking out the electric energy from the fuel cell to drive a motor connected to drive wheels with only water remaining as emission matter.

In the solid polymer fuel cell, when using air as oxidant gas, nitrogen passing from a cathode to an anode through the electrolyte membrane remains in an anode system to lower a hydrogen partial pressure, resulting in deterioration in an efficiency of the fuel cell. For this reason, if the nitrogen remains in the anode system to some extent, there is a need for fuel gas containing nitrogen to be purged to the outside of the system from a purge valve located at an outlet of the anode. Such operation is sometimes referred to as "anode-purging". When this takes place, the gas discharged from the anode is called as anode off-gas that includes flammable gas containing hydrogen. It is undesirable for hydrogen to be directly discharged to the outside and, hence, the purged anode off-gas is combusted in a catalytic combustor, thereby enabling mixed gas containing nitrogen and steam to be exhausted to the outside of the system.

Among technologies for combusting anode off-gas, a typical one technology is known from Japanese Patent Provisional Publication No. 7-78626 (see Page 3 and FIG. 1). This technology takes the form of a structure that is comprised of a mixture which permits a portion of cathode off-gas and anode off-gas to be mixed in a fuel cell, a regulator unit that regulates the flow rate of combustion exhaust gas in an exhaust gas delivery line, depending upon the flow rate of feed gas in a fuel line, based on a predetermined relationship such that a mixture ratio in the mixer between anode off-gas and cathode off-gas lying at a value deviated from an explosion limit.

DISCLOSURE OF THE INVENTION

However, since the related art technology takes the form of the structure wherein anode off-gas and cathode off-gas are combusted at the mixture ratio lying at a value deviated from the explosion limit, in case of combusting mixed gas with the mixture ratio falling at a value less than an explosion lean-limit, the flow rates of oxidant gas needed for combustion increase and, therefore, the amount of catalyst needed for processing fuel gas is increased. This results in an issue wherein the catalytic combustor is required to be formed in an excessively large size or a recovery efficiency of heat energy is deteriorated due to the combustion temperature being relatively dropped to a lower level.

Further, another issue encountered in the related art resides in that when the mixture ratio lies at a value greater than an excessively high concentration limit, the flammable gas is discharged to the outside of the system, causing a deteriorated reliability in a safety.

To address the above issues, one aspect of the present invention provides a fuel cell system which comprises a fuel gas supply unit supplying fuel gas, an oxidant gas supply unit supplying oxidant gas, a fuel cell stack having an anode, from which anode off-gas is expelled, and a cathode, from which cathode off-gas is expelled, that generate electric power upon electrochemical reaction between the fuel gas and the oxidant gas, a catalytic combustor combusting mixed gas between the fuel gas or the anode off-gas and the oxidant gas or the cathode off-gas, an anode off-gas control valve selectively supplying at least one of the fuel gas and the anode off-gas to the catalytic combustor during an ignition period, a cathode off-gas control valve selectively supplying at least one of the oxidant gas and the cathode off-gas to the catalytic combustor during the ignition period, and a controller operative to control the anode off-gas control valve and the cathode off-gas control valve such that at least during the ignition period until the catalytic combustor is discriminated to be sufficiently activated from commencement of supplying the mixed gas to the catalytic combustor, a fuel gas concentration of the mixed gas is maintained in a given range whereas after the ignition period has been elapsed, the mixed gas is supplied to the catalytic combustor even if the fuel gas concentration lying at a value deviated from the given range.

The other aspect of the present invention is a method of operating a fuel cell system having a fuel gas supply unit for supplying fuel gas and an oxidant gas supply unit for supplying oxidant gas, which method comprises providing a fuel cell stack having an anode, from which anode off-gas is expelled, and a cathode, from which cathode off-gas is expelled, that generate electric power upon electrochemical reaction between the fuel gas and the oxidant gas, providing a catalytic combustor that combusts mixed gas between the anode off-gas discharged from the anode of the fuel cell stack and the cathode off-gas discharged from the cathode of the fuel cell stack, supplying at least one of the fuel gas and the anode off-gas to the catalytic combustor during an ignition period, supplying at least one of the oxidant gas and the cathode off-gas to the catalytic combustor during the ignition period, and controlling a fuel concentration of the mixed gas to be supplied to the catalytic combustor such that at least during the ignition period until the catalytic combustor is discriminated to be sufficiently activated from commencement of supplying the mixed gas to the catalytic combustor, the fuel gas concentration of the mixed gas is maintained in a given range whereas after the ignition period has been elapsed, the mixed gas is supplied to the catalytic combustor even if the fuel gas concentration lying at a value deviated from the given range.

BEST MODE FOR CARRYING OUT THE INVENTION

First Embodiment

Figure 1:
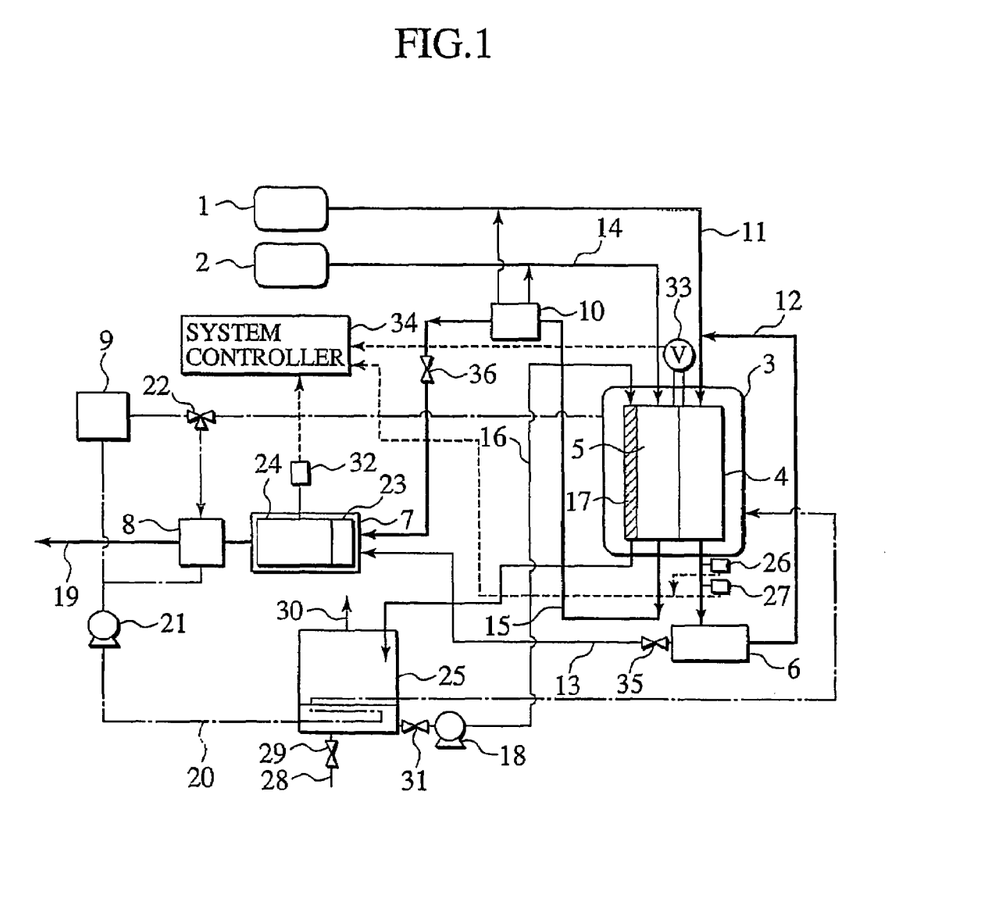
FIG. 1 is an overall structural view of a fuel cell system of a first embodiment of the present invention.

Referring now to FIG. 1, FIGS. 2A to 2C and FIG. 3, a first embodiment of a fuel cell system according to the present invention is described in detail. FIG. 1 is a structural view of the fuel cell system of the first embodiment.

In FIG. 1, the fuel cell system of the presently filed embodiment is shown including a hydrogen supply unit (fuel gas supply unit) 1 that supplies hydrogen as fuel gas to an anode 4 of a fuel cell stack 3 through an anode gas supply conduit 11, and an air supply unit (oxidant gas supply unit) 2 that supplies air as oxidant gas to a cathode 5 through a cathode gas supply conduit 14. The fuel cell stack 3 is supplied with hydrogen and air to achieve electrochemical reaction for thereby generating electric power.

When this takes place, anode off-gas, that is not consumed in the anode 4, is expelled from the anode 4, and cathode off-gas resulting from a portion of oxidant gas consumed in the cathode 5 and containing moisture created through electric power generation is expelled from the cathode 5.

During normal operation of the fuel cell stack 3, a whole amount of anode off-gas is delivered through an anode off-gas recirculation conduit 12 to an anode gas supply conduit 11 and then introduced to the anode 4 again. On the other hand, cathode off-gas is delivered through a cathode off-gas delivery conduit 15 and the humidifier 10, that humidify hydrogen and air to be introduced to the fuel cell stack 3, to the catalytic combustor 7 through which cathode off-gas is exhausted to the outside.

The catalytic combustor 7 is comprised of a mixer 23 in which hydrogen or anode off-gas and air or cathode off-gas are mixed to form uniformly mixed gas, and a combustion chamber 24 that carries a combustion catalyst to combust mixed gas to form combustion gas. The combustion gas is heat exchanged with coolant in the coolant heat exchanger 8 and then exhausted to the outside of the system through an exhaust pipe 19.

For the purpose of maintaining the fuel cell stack 3 at an optimum operating temperature suitable for electric power generation, the fuel cell stack 3 is internally formed with coolant passages which are not shown. During a normal operation mode, coolant flows from a coolant outlet port of the fuel cell stack 3 to pass through a coolant passage regulator valve 22, the coolant cooling unit 9, the coolant pump 21, and a coolant passage inside a drain tank 25, and is circulated through a coolant inlet port of the fuel cell stack 3, the coolant passage inside the fuel cell stack 3 and the coolant outlet port thereof. And, reaction heat developed in the fuel cell stack 3 is radiated to the outside from the coolant cooling unit 9 and thus, the fuel cell stack 3 is maintained at a prescribed appropriate temperature.

Also during a start-up mode of the fuel cell system, since the temperature of coolant remains at a low level, hydrogen and air are introduced to the catalytic combustor 7 to combust these components, and the combustion heat is used for heating coolant passing through the coolant heat exchanger 8 raise the coolant temperature so as to warm up the fuel cell stack 3 to an optimum operating temperature. In particular, during the start-up mode, the coolant passage regulator valve 22 permits the coolant pump 21 and the coolant heat exchanger 8 to communicate one another, thereby allowing coolant to circulate through a closed circuit comprised of the coolant heat exchanger 8, the coolant pump 21, the drain tank 25, the coolant inlet port of the fuel cell stack 3, the coolant outlet port of the fuel cell stack 3 and the coolant passage regulator valve 22. This allows the coolant temperature to develop in the coolant heat exchanger 8, thereby enabling the operating temperature of the fuel cell stack 3 to be raised to the temperature appropriate for commencing start-up operation.

Also, water resulting from the cathode 5 of the fuel cell stack 3 is expelled through a water channel 17 to the drain tank 25, in which water is de-ionized whereupon pure water is added to de-ionized water. For the purpose of humidifying the electrolyte membrane of the fuel cell stack 3, water is drawn from the drain tank 25 and circulated through a water supply conduit 16 to the fuel cell stack 3. Moreover, excessive water in the drain tank 25 is controlled by a drain valve 29 and drained through a drain conduit 28 to the outside. Such a circulation path for the stream of pure water plays a role to allow hot coolant, flowing through the above-described drain tank 25, to preclude pure water from lowered in temperature and from being frozen or to thaw frozen pure water.

Connected to a system controller (serving as a control means) 34 that controls the fuel cell system are a temperature detector 32 that detects the temperature of the catalytic combustor 7, a voltage detector 33 that detects an output voltage of the fuel cell stack 3, a pressure detector 26 that detects the pressure of anode off-gas at an anode outlet, and a temperature detector 27 that detects the temperature of anode off-gas at the anode outlet.

The system controller 34 is applied with detection signals from these detectors and discriminates an activated condition of the catalytic combustor 7 and controls the hydrogen supply unit 1, the air supply unit 2, an anode off-gas discharge valve 35 serving as a control valve, a cathode off-gas discharge valve 36, serving as a cathode pressure control valve, for thereby controlling a fuel concentration of mixed gas between hydrogen or anode off-gas and air or cathode off-gas in the catalytic combustor 7.

Figure 2A:
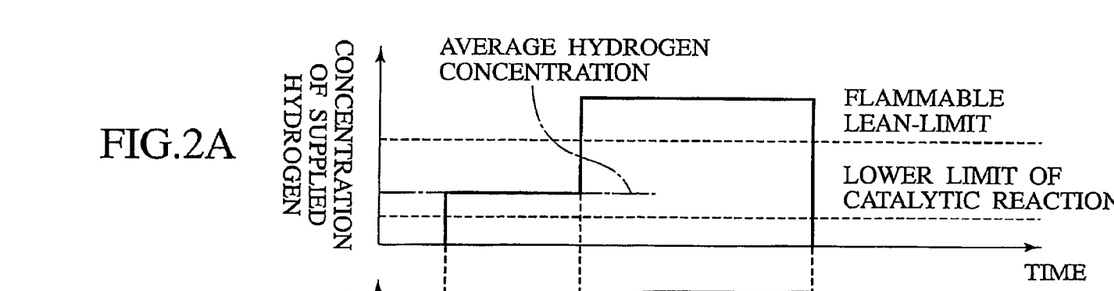
FIGS. 2A to 2C are timing charts for illustrating how system control is performed in the fuel cell system of the first embodiment shown in FIG. 1.
Figure 2B:
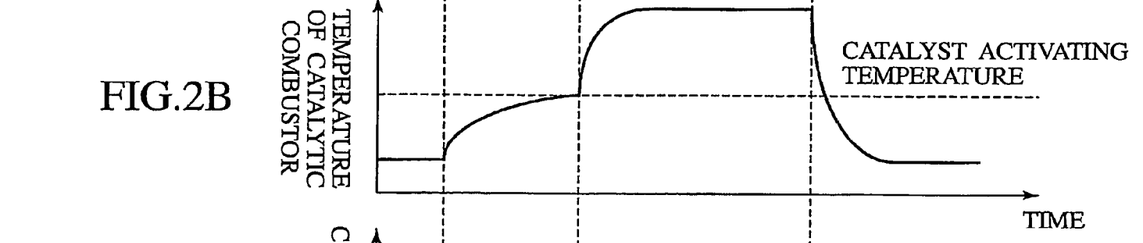
Figure 2C:
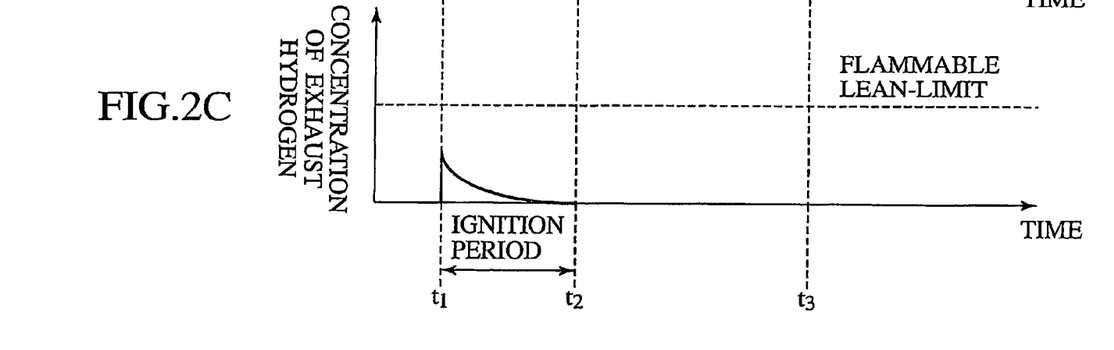

FIGS. 2A to 2C are timing charts for illustrating how the system controller 34 forming part of the first embodiment controls a hydrogen concentration of mixed gas to be supplied to the catalytic combustor 7, with FIG. 2A representing the concentration of hydrogen supplied to the catalytic combustor, FIG. 2B the temperature of the catalytic combustor 7 and FIG. 2C the concentration of exhaust hydrogen discharged from the catalytic combustor 7.

First, at a time t1, when the temperature of the catalytic combustor 7 remains sufficiently lower than the catalyst activating temperature, the system controller 34 is responsive to the detection signal delivered from the temperature detector 32 and operates the anode off-gas discharge valve 35 and the air supply unit and the cathode off-gas discharge valve 36 to commence supply of the mixed gas between hydrogen or anode off-gas and air or cathode off-gas to the catalytic combustor 7 at a given hydrogen concentration greater than a catalyst activating lower limit and less than a flammable lean-limit.

Since the catalytic combustor 7 has almost no activity when supplied with the mixed gas at the given hydrogen concentration greater than the catalyst activating lower limit and less than the flammable lean-limit, in an initial stage, exhaust gas is expelled at a hydrogen concentration closer to that of hydrogen supplied to the catalytic combustor 7. However, since the activation of the catalyst is facilitated during an ignition period between t1 and t2 and a conversion efficiency is improved, the concentration of exhaust hydrogen drops and the temperature of the catalytic combustor 7 rises.

And, at a time t2, when the temperature of the catalytic combustor 7 has reached the catalyst activating temperature, the system controller 34 increases the flow rate of hydrogen to be supplied by the hydrogen supply unit 1 to increase the hydrogen concentration to a value greater than the flammable lean-limit. Although this allows the hydrogen concentration to rise, since the temperature of the catalytic combustor 7 has already reached the catalyst activating temperature, hydrogen in mixed gas introduced to the catalytic combustor 7 is sufficiently converted such that the concentration of exhaust hydrogen nearly zeroes and is maintained at a hydrogen concentration extremely lower than that of the flammable lean-limit.

Figure 3:
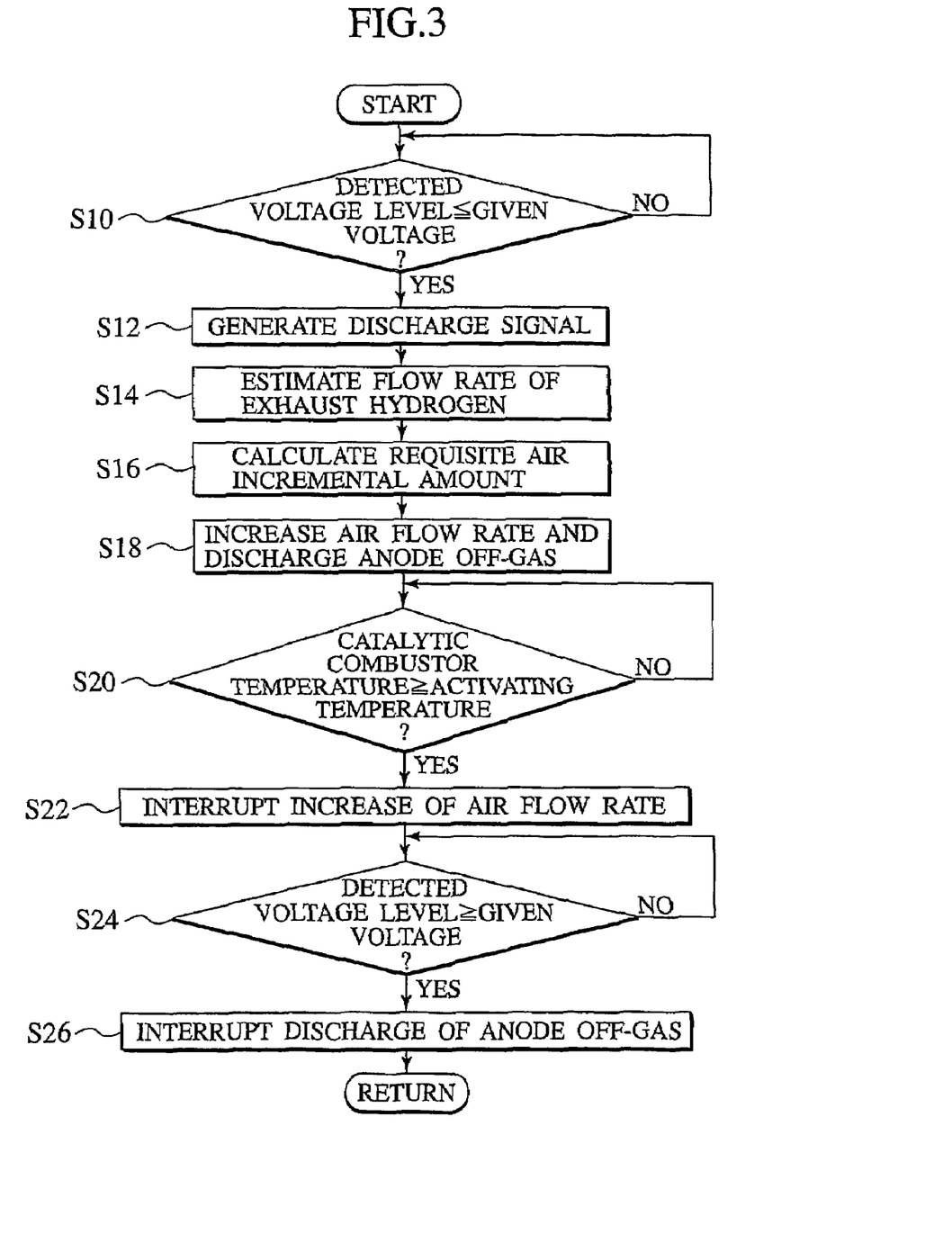
FIG. 3 is a control flowchart illustrating a basic sequence of operation of the fuel cell system of the first embodiment shown in FIG. 1.

Next, referring to a control flow chart of FIG. 3, description is made of control to be performed by the system controller 34 forming part of the presently filed embodiment.

Initially, in step S10, the system controller 34 discriminates to find whether the fuel cell stack 3 remains in a given status. Here, discrimination is made to find whether the detected voltage level resulting from the voltage detector 33, by which the output voltage of the fuel cell stack 3 is detected, is below a given voltage level. If the detected voltage level is found to exceed the given voltage level, operation is routed back to step S10.

In contrast, if the detected voltage level is found to remain lower than the given voltage level, operation is routed to step S12 to permit the system controller 34 to generate a discharge signal requesting purge operation. Upon receipt of this discharge signal, the anode off-gas discharge valve 35 is opened by the system controller 34 to allow anode off-gas to be supplied from the anode off-gas recirculation unit 6 to the catalytic combustor 7 at a given flow rate while controlling the fuel supply unit 1 to allow hydrogen to be supplied to the fuel cell stack 3 at a flow rate increased by a value substantially equal to the flow rate of anode off-gas to be discharged from the anode off-gas recirculation unit 6 and permitting hydrogen to be kept under a fixed pressure level. In this respect, for the sake of simplifying a structure, the anode off-gas discharge valve 35 exemplarily takes the form of a shut-off valve.

In next step S14, the flow rate of anode off-gas to be discharged from the fuel cell stack 3 is estimated based on the pressure and the temperature of anode off-gas detected by the pressure detector 26 and the temperature detector 27, respectively.

In subsequent step S16, depending upon the estimated flow rate of anode off-gas, calculation is made to obtain a demanded incremental flow rate of air (i.e., a demanded flow rate of cathode off-gas) required for maintaining mixed gas to be supplied to the catalytic combustor 7 at a hydrogen concentration greater than a value causing the combustion temperature to raise to the activating temperature of the catalytic combustor 7 and less than the flammable lean-limit (of a value below 4%: here, for instance, 3%) of hydrogen.

In succeeding step S18, depending upon the incremental flow rate of air obtained through calculation, the system controller 34 controls the air supply unit 2 to increase the flow rate of air to be supplied to the fuel cell stack 3 and, thereafter, anode off-gas is discharged through the anode off-gas discharge valve 35.

Here, during the ignition period (between t1 and t2 in FIG. 2) where the catalytic combustor 7 is discriminated to be sufficiently activated after commencing to discharge anode off-gas, the temperature of the catalytic combustor 7 remains relatively low and the conversion efficiency remains inadequate, resulting in a probability where a portion of anode off-gas is discharged to the outside of the system in unburned status. When this takes place, since the unburned hydrogen remains at a concentration below the flammable lean-limit, no ignition occurs inside or outside the system, resulting in no fear of occurrence of deterioration in a safety of the system.

In consecutive step S20, discrimination is made to find whether the temperature of the catalytic combustor 7 detected by the temperature detector 32 exceeds the activating temperature. If the temperature of the catalytic combustor 7 is found to be lower than the activating temperature, operation is waited in step S20.

At a time t2 where the temperature of the catalytic combustor 7 is found to exceed the activating temperature, since the catalytic combustor 7 has a sufficiently facilitated activity with a resultant extremely less probability in occurrence of unburned hydrogen being exhausted, operation is routed to step S22 to interrupt operation for increasing the air flow rate while allowing discharge of anode off-gas to be continued.

In subsequent step S24, operation is waited until the detected voltage level of the voltage detector 33 for detecting the output voltage of the fuel cell stack 3 reaches a value greater than a given voltage value. If the detected voltage level is found to exceed the given voltage value, operation is routed to step S26 wherein the anode off-gas discharge valve 35 is closed to interrupt the discharging of anode off-gas whereupon operation is restored to a given operating condition.

According to the first embodiment set forth above, due to an ability of the system controller performing control such that at least during the ignition period wherein the catalytic combustor 7 is found to be adequately activated after commencing to supply mixed gas, the fuel gas concentration in mixed gas is maintained in a given range and after the catalytic combustor 7 is found to be adequately activated, even the mixed gas lying at a value deviated from a range of the above-described fuel gas concentration is available to be supplied, it is possible to operate the fuel cell system under an appropriate condition depending upon the condition of the catalytic combustor 7.

Further, by selecting a fuel gas concentration range during the ignition period to be greater than the concentration at which the combustion temperature of mixed gas reaches the activating temperature of the catalytic combustor, the catalyst of the catalytic combustor can be rapidly activated, reducing emission of unburned gas.

In addition, by selecting the fuel gas concentration range during the ignition period to be less than the concentration that lies at a flammable limit of fuel gas, exhaust gas can be safely exhausted to the outside of the system without causing exhaust gas from being ignited even in a case where inadequate combustion takes place in the catalytic combustor with a resultant unburned fuel gas being discharged.

Also, under a condition, such as in cold temperatures, where the catalytic combustor 7 is hard to be activated, a control concept of the present invention can be applied to a case where ignition is carried out using an auxiliary heater means such as an electric heater.

Second Embodiment

Next, referring to FIGS. 4A to 4C and FIG. 5, description is made of a fuel cell system of a second embodiment of the present invention. The fuel cell system of the second embodiment is similar in structure to that shown in FIG. 1, with like component parts bearing the same reference numerals for a simplicity of description.

Figure 4A:
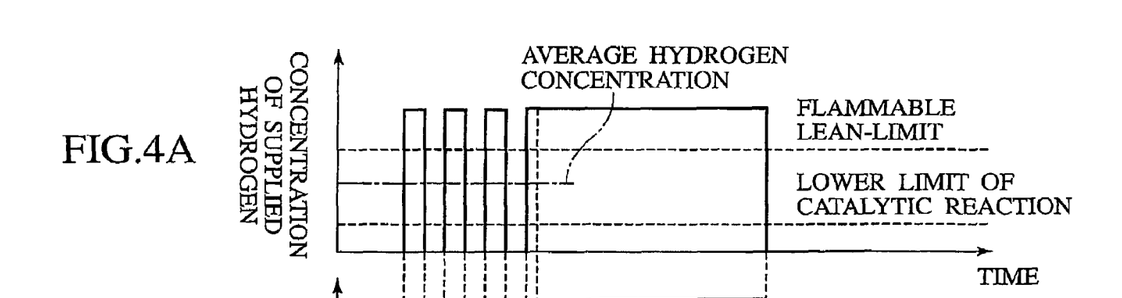
FIGS. 4A to 4C are timing charts for illustrating how system control is performed in a fuel cell system of a second embodiment of the present invention.
Figure 4B:
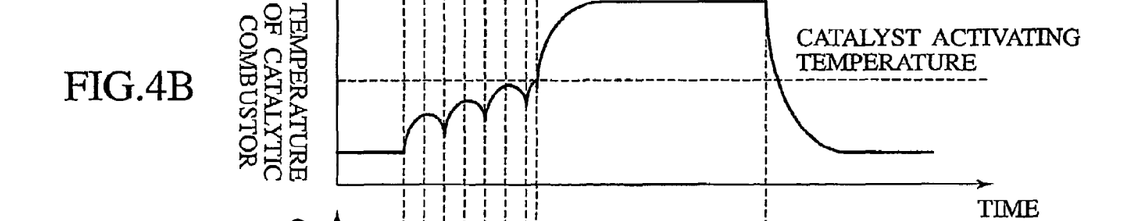
Figure 4C:
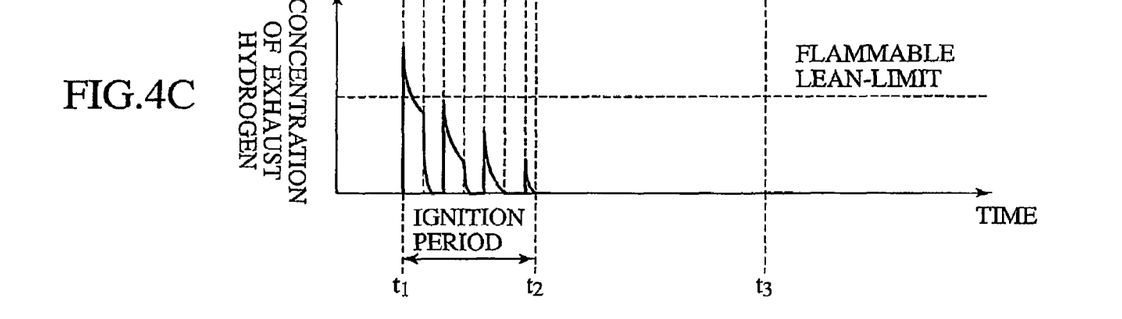

The fuel cell system of the presently filed embodiment differs from that of the first embodiment in that during the ignition period, no incremental operation for the air flow rate is performed and the system controller (control means) 34 controls in a way to intermittently supply anode off-gas at given time intervals shorter than the ignition time period.

FIGS. 4A to 4C are timing charts for illustrating how the system controller 34 forming part of the second embodiment controls a hydrogen concentration of mixed gas to be supplied to the catalytic combustor 7, with FIG. 4A representing the concentration of hydrogen supplied to the catalytic combustor 7, FIG. 4B the temperature of the catalytic combustor 7 and FIG. 4C the concentration of exhaust hydrogen discharged from the catalytic combustor 7.

First, at a time t1, when the temperature of the catalytic combustor remains sufficiently lower than the catalyst activating temperature, the system controller 34 is responsive to the detection signal produced by the temperature detector 32 and controls the hydrogen supply unit 1 and the air supply unit 2 to allow the catalytic combustor 7 to be intermittently supplied with hydrogen or anode off-gas and continuously supplied with air or cathode off-gas, respectively. When this takes place, an average hydrogen concentration of mixed gas between hydrogen or anode off-gas to be intermittently supplied and air or cathode off-gas to be continuously supplied is set to be higher than a catalyst activation lower limit and lower than the flammable lean-limit.

When the supply of mixed gas at such an average concentration has been commenced, since the catalytic combustor 7 has almost no activity, exhaust gas with the hydrogen concentration closer to the concentration of supplied hydrogen is expelled in an initial stage. However, since the catalyst activation is facilitated during the ignition period between t1 and t2 to improve the conversion efficiency, the exhaust hydrogen concentration intermittently drops and the temperature of the catalytic combustor rises in upwardly protruded stages with round configurations.

And, at a time t2, when the temperature of the catalytic combustor 7 has reached the catalyst activating temperature, the system controller 34 controls the hydrogen supply unit 1 to allow anode off-gas to be supplied to the catalytic combustor 7 to cause the mixed gas to lie at the hydrogen concentration greater than the flammable lean-limit. Although this allows the concentration of supplied hydrogen to raise, since the temperature of the catalytic combustor 7 has reached the catalyst activating temperature, hydrogen in mixed gas is sufficiently converted such that the concentration of exhaust hydrogen nearly zeroes and is maintained at a low concentration extremely lower than that of the flammable lean-limit.

This allows the average hydrogen concentration during the ignition period to remain at the concentration that induces the combustion temperature above the activating temperature of the catalytic combustor 7 and at the concentration (of a value less than 4%: here, for instance, 3%) below the flammable lean-limit of hydrogen.

For this reason, the hydrogen concentration in mixed gas can be regulated in a high response due to the presence of a short distance between the anode off-gas discharge valve 35 and the catalytic combustor 7 while making it possible to use the anode off-gas discharge valve 35 comprised of a simplified structure such as a shut-off valve. Also, since no increase in the flow rate of air results in, it is possible to restrict the load of a compressor forming the air supply unit 2 from increasing, resulting in a capability of suppressing an increase in electric power consumption.

Figure 5:
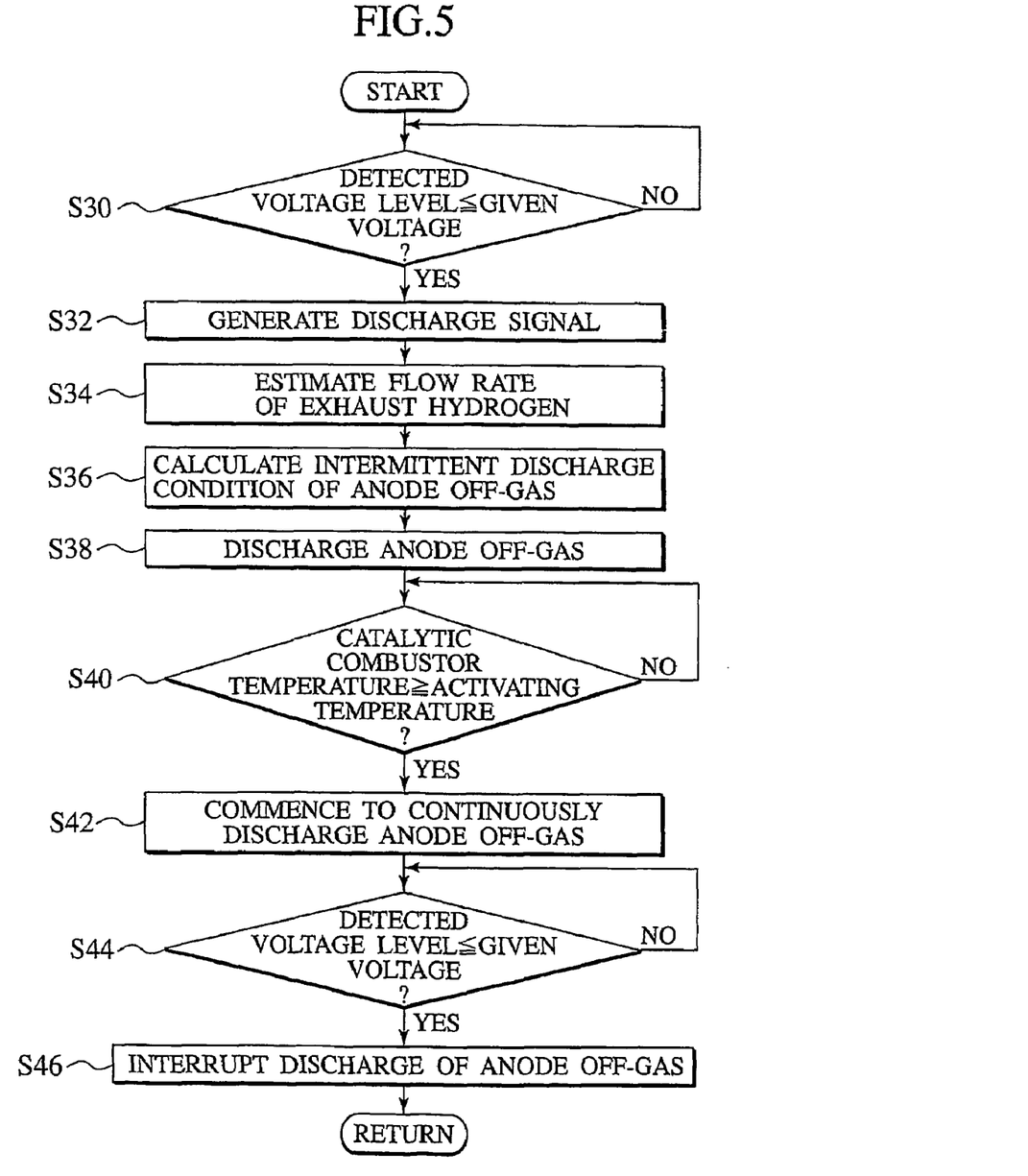
FIG. 5 is a control flowchart illustrating a basic sequence of operation of the fuel cell system of the second embodiment.

Next, referring to a control flow chart of FIG. 5, description is made of control to be performed by the system controller 34 forming part of the presently filed embodiment.

Initially, in step S30, the system controller 34 discriminates to find whether the fuel cell stack 3 remains in a given status. Here, discrimination is made to find whether the detected voltage level resulting from the voltage detector 33, by which the output voltage of the fuel cell stack 3 is detected, is below a given voltage level. If the detected voltage level is found to exceed the given voltage level, operation is routed back to step S30.

In contrast, if the detected voltage level is found to remain to be lower than the given voltage level, operation is routed to step S32 to permit the system controller 34 to generate an discharge signal requesting purge operation. Upon receipt of this discharge signal, the system controller 34 intermittently opens and closes the anode off-gas discharge valve 35 to allow the anode off-gas recirculation unit 6 to discharge anode off-gas to the catalytic combustor 7 at a given flow rate and, at the same time, the hydrogen supply unit 1 is controlled to increase the flow rate of hydrogen by an amount substantially equal to the flow rate of anode off-gas being discharged from the anode off-gas recirculation unit 6 while permitting the pressure of hydrogen to be kept at a fixed level. In this respect, for the sake of simplifying a structure, the anode off-gas discharge valve 35 takes the form of a shut-off valve.

In next step S34, the flow rate of anode off-gas is estimated based on the pressure and the temperature of anode off-gas detected by the pressure detector 26 and the temperature detector 27, respectively.

In subsequent step S36, depending upon the estimated flow rate of anode off-gas, calculation is made to find out an intermittent discharge condition of anode off-gas required for maintaining the hydrogen concentration in mixed gas to be supplied to the catalytic combustor 7 at a concentration greater than the combustion temperature above the activating temperature of the catalytic combustor 7 and at a concentration (of a value below 4%: here, for instance, 3%) less than the flammable lean-limit of hydrogen.

In succeeding step S38, depending upon the intermittent discharge condition of anode off-gas resulting from calculation, the system controller 34 operates to allow the anode off-gas discharged valve 35 to be intermittently opened or closed to intermittently discharge anode off-gas. When this takes place, since a discharge flow rate of cathode off-gas is maintained at a level before the discharge signal has been outputted, no change occurs in the discharge flow rate of cathode off-gas and no probability occurs in an increase in electric power consumption of the air supply unit 2.

Here, during the ignition period (between t1 and t2 in FIG. 4) in which discrimination is made to find out that the catalytic combustor 7 has been sufficiently activated after start of discharging anode off-gas, the temperature of the catalytic combustor 7 remains relatively low and the conversion efficiency remains inadequate, resulting in a probability where a portion of anode off-gas is discharged in unburned status. When this takes place, since unburned hydrogen remains at a concentration that exceeds the flammable lean-limit for an extremely short period of time, no ignition occurs inside or outside the system, resulting in no fear of occurrence of deterioration in a safety of the system.

In consecutive step S40, discrimination is made to find whether the temperature of the catalytic combustor 7 detected by the temperature detector 32 exceeds the activating temperature. If the temperature of the catalytic combustor 7 is found to be less than the activating temperature, operation is waited in step S40.

At a time where the temperature of the catalytic combustor 7 is found to exceed the activating temperature, since the catalytic combustor 7 has a sufficiently facilitated activity with a resultant extremely less probability in occurrence of unburned hydrogen being discharged, operation is routed to step S42 where the anode off-gas discharge valve 35 begins to continuously discharge anode off-gas.

In subsequent step S44, operation is waited until the detected voltage level of the voltage detector 33 for detecting the output voltage of the fuel cell stack 3 reaches a value greater than the given voltage value. If the detected voltage level is found to exceed the given voltage value, operation is routed to step S46 wherein the anode off-gas discharge valve 35 is closed to interrupt the discharging of anode off-gas whereupon operation is restored to a given operating condition.

According to the second embodiment set forth above, due to the presence of control through which the average concentration of fuel gas in mixed gas falls in a given range, a ratio between a total amount of unburned fuel gas and a total amount of exhaust gas to be discharged during the ignition period can be regulated to fall in a given range, thereby enabling a safety to be enhanced even when exhaust gas is expelled to a dead air space.

Further, by performing control so as to intermittently supply fuel gas, mixed gas can be supplied in pulsed phases at a fuel gas concentration greater than a given range to increase a heat value due to supply of hydrogen at a high concentration for thereby improving a temperature rise characteristic of the catalytic combustor, and due to the presence of control through which the unburned hydrogen concentration in exhaust gas remains in the average level below the flammable limit during the ignition period, it is possible to perform warm-up of the catalytic combustor and the discharging of exhaust gas in a safe manner.

Also, on the contrary, attempt may be undertaken to allow anode off-gas to remain at the given flow rate and to permit the flow rate of air to intermittently increase such that the average hydrogen concentration during the ignition period lies at a concentration in which the combustion temperature exceeds the activating temperature of the catalytic combustor 7 and at a concentration below the flammable lean-limit of hydrogen.

In such case, the heat value can be increased and thus, the activation of the catalytic combustor 7 can be relatively and rapidly performed.

Also, in an alternative, it is so controlled that the maximum concentration of fuel gas in mixed gas during the ignition period falls in a given range. In this case, the exhaust gas can be safely expelled to the outside of the system with no occurrence of exhaust gas being ignited at all times during the ignition period wherein a probability exists for unburned fuel gas to be discharged.

Third Embodiment

Next, referring to FIGS. 6A to 6C and FIG. 7, description is made of a fuel cell system of a third embodiment of the present invention. The fuel cell system of the third embodiment is similar in structure to that shown in FIG. 1.

Figure 6A:
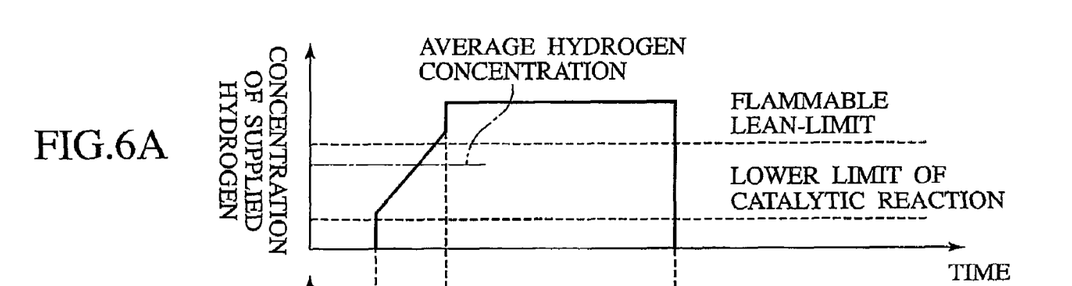
FIGS. 6A to 6C are timing charts for illustrating how system control is performed in a fuel cell system of a third embodiment of the present invention.
Figures 6B, 6C:
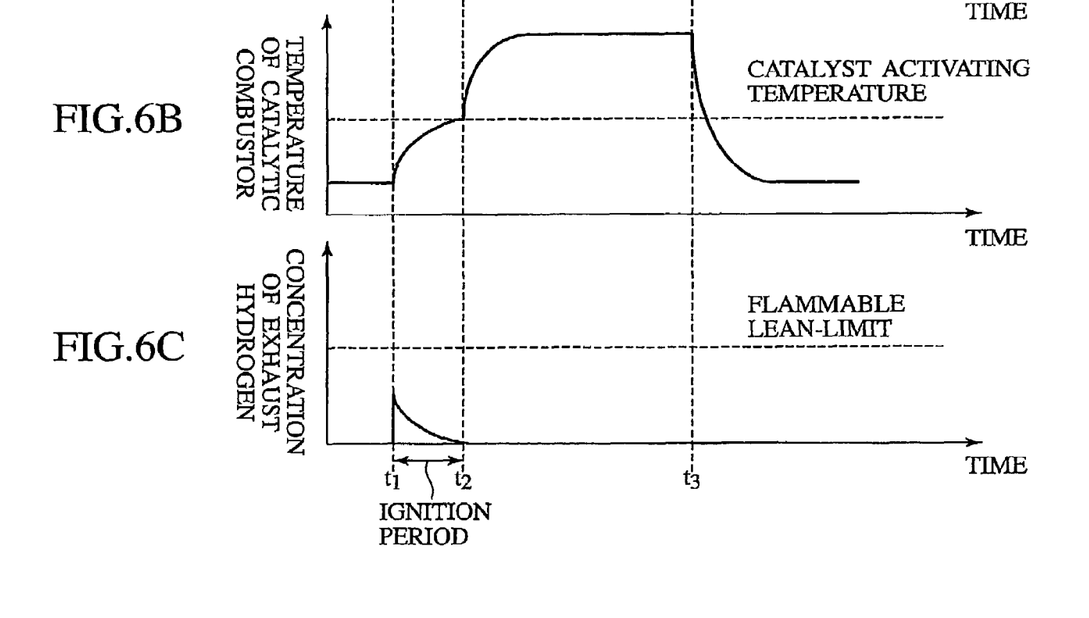

The fuel cell system of the presently filed embodiment differs from that of the first embodiment in that the flow rate of anode off-gas is increased based on a hydrogen concentration incremental pattern, that is preliminarily obtained for the ignition period, so as to allow the hydrogen concentration in mixed gas to transiently vary from the lower concentration than the flammable lean-limit to the higher concentration than the flammable lean-limit and to allow the average hydrogen concentration during the ignition period to fall in a value above the concentration at which the combustion temperature reaches a value greater than the activating temperature of the catalytic combustor 7 and at the hydrogen concentration (of 4%: here, for instance, 3%) less than the flammable lean-limit of hydrogen.

The presently filed embodiment contemplates to take a structure in which the anode off-gas discharged valve 35 is comprised of a flow regulator valve and control is performed such that the flow rate of anode off-gas increases in dependence on the temperature rise of the catalytic combustor 7 and under a condition where the temperature remains low and the activity of the catalyst remains low, the flow rate of anode-off gas to be supplied remains low and the flow rate of unburned hydrogen decreases whereupon the flow rate of anode off-gas increases as the temperature increases for thereby suppressing deterioration in a safety and reliability of the system.

However, when this takes place, in case where the temperature of the catalytic combustor 7 does not increase even after an elapse of a given pattern prescribed time interval such as a case with the catalyst being deteriorated, the system controller 34 achieves the same control as that of the first embodiment, after an incremental pattern has been terminated for enabling the catalytic combustor 7 to have the activity.

FIGS. 6A to 6C are timing charts for illustrating how a system controller 34 forming part of the presently filed embodiment controls the mixed gas concentration, with FIG. 6A representing the concentration of hydrogen supplied to the catalytic combustor, FIG. 6B the temperature of the catalytic combustor and FIG. 6C the concentration of exhaust hydrogen discharged from the catalytic combustor.

First, at a time t1, when the temperature of the catalytic combustor 7 remains sufficiently lower than the catalyst activating temperature, the system controller 34 is responsive to the detection signal delivered from the temperature detector 32 and opens the anode off-gas discharge valve 35 to commence supply of the mixed gas between hydrogen or anode off-gas and air or cathode off-gas to the catalytic combustor 7. Thereafter, depending upon a selected hydrogen concentration incremental pattern, the system controller 34 increases the opening degree of the anode off-gas discharge valve 35 so as to increase the flow rate of anode off-gas to be supplied to the catalytic combustor 7 to increase the hydrogen concentration in mixed gas in the catalytic combustor 7.

When the supply of mixed gas at the hydrogen concentration greater than the catalyst activating lower limit and less than the flammable lean-limit has been commenced, since the catalytic combustor 7 has almost no activity, exhaust gas with the hydrogen concentration closer to that of supplied hydrogen is expelled in an initial stage. However, since the catalyst activation is facilitated during the ignition period between t1 and t2 to improve the conversion efficiency, the concentration of exhaust hydrogen to be exhausted drops and the temperature of the catalytic combustor rises.

And, at a time t2, when the temperature of the catalytic combustor 7 has reached the catalyst activating temperature at t2, the system controller 34 increases the opening degree of the anode off-gas discharge valve 35 so as to increase the flow rate of anode off-gas to be supplied to the catalytic combustor 7 to increase the hydrogen concentration in mixed gas to be supplied to the catalytic combustor 7 to a value greater than the flammable lean-limit. Although this allows the hydrogen concentration to rise, since the temperature of the catalytic combustor 7 has reached the catalyst activating temperature, hydrogen in mixed gas is sufficiently converted such that the concentration of exhaust hydrogen nearly zeroes and is maintained at a low concentration extremely lower than that of the flammable lean-limit.

Figure 7:
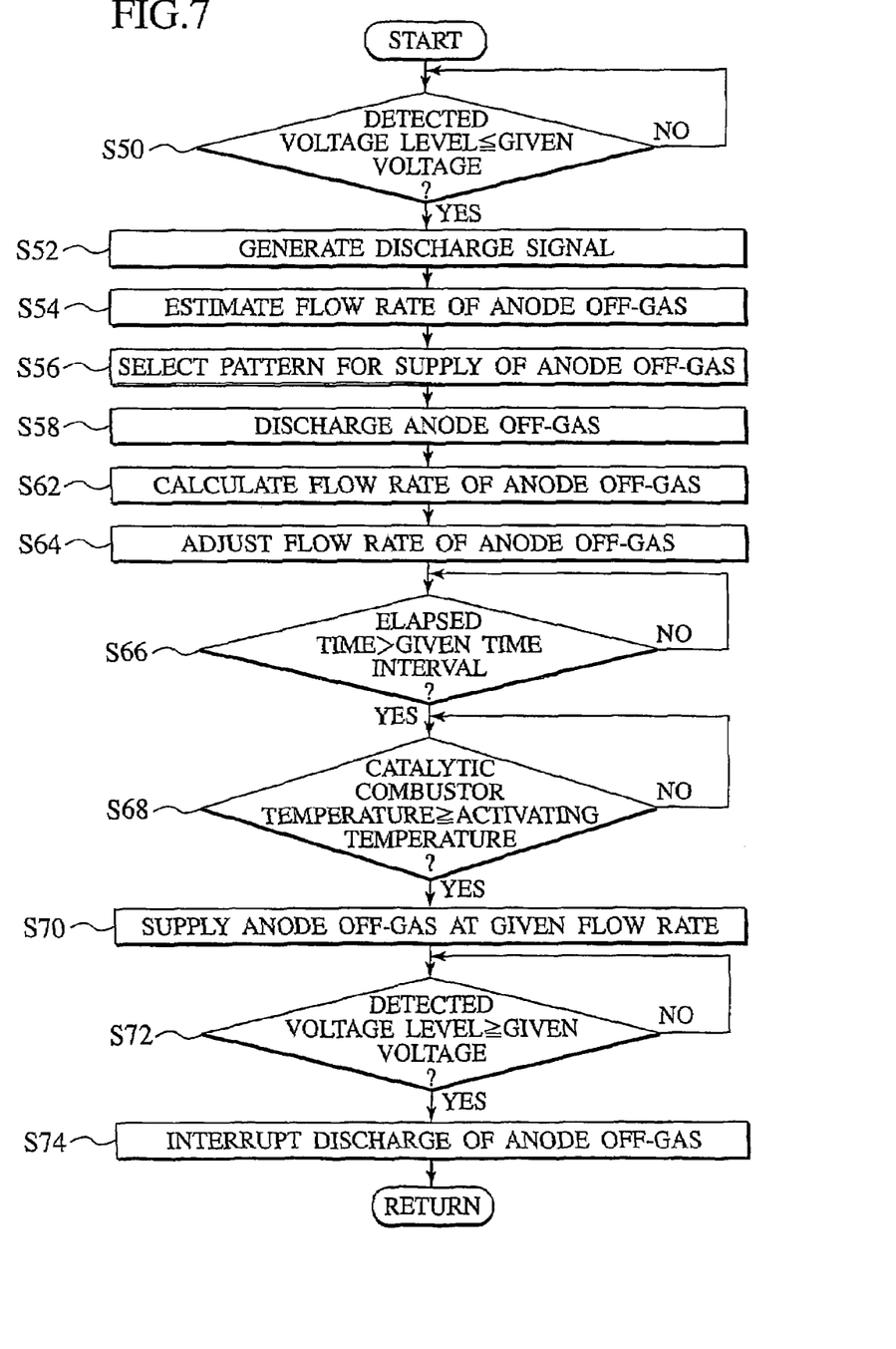
FIG. 7 is a flowchart illustrating a basic sequence of operation of the fuel cell system of the third embodiment.

Next, referring to a control flow chart of FIG. 7, description is made of control to be performed by the system controller forming part of the presently filed embodiment.

Initially, in step S50, the system controller 34 discriminates to find whether the fuel cell stack 3 remains in a given status. Here, discrimination is made to find whether the detected voltage level resulting from the voltage detector 33, by which the output voltage of the fuel cell stack 3 is detected, is below a given voltage level. If the detected voltage level is found to exceed the given voltage level, operation is routed back to step S50.

In contrast, if the detected voltage level is found to remain to be lower than the given voltage level, operation is routed to step S52 to permit the system controller 34 to generate an discharge signal requesting purge operation. Upon receipt of this discharge signal, the system controller 34 opens the anode off-gas discharge valve 35 to allow the anode off-gas recirculation unit 6 to discharge anode off-gas to the catalytic combustor 7 at a given flow rate and, at the same time, the hydrogen supply unit 1 is controlled to increase the flow rate of hydrogen by an amount substantially equal to the flow rate of anode off-gas being discharged from the fuel cell stack 3 while permitting the pressure of hydrogen to be kept at a fixed level.

In next step S54, the flow rate of anode off-gas is estimated based on the pressure and the temperature of anode off-gas detected by the pressure detector 26 and the temperature detector 27, respectively.

In subsequent step S56, depending upon the estimated flow rate of anode off-gas, the system controller 34 selects an anode off-gas supply pattern to sequentially increase the flow rate of anode off-gas to be supplied to the catalytic combustor 7. In this respect, a plurality of anode off-gas supply patterns, that enable the catalyst to be activated within the shortest time interval for each segment of the flow rates of anode off-gas, are experimentally derived and these patterns are preliminarily stored in the system controller 34.

Further, these anode off-gas supply patterns include patterns in which the hydrogen concentration in mixed gas to be supplied to the catalytic combustor 7 lies at a concentration at which the combustion temperature exceeds the activating temperature of the catalytic combustor 7 and a concentration (of 4%: here, for instance, 3%) less than the flammable lean-limit of hydrogen.

In succeeding step S58, depending upon the anode off-gas supply pattern that is selected, the system controller 34 operates to allow the opening of the anode off-gas discharged valve 35 to be controlled to commence the discharging of anode off-gas, while counting a time interval elapsed from the commencement.

Here, during the ignition period (between t1 and t2 in FIG. 6) in which discrimination is made to find out that the catalytic combustor 7 has been sufficiently activated after start of discharging anode off-gas, the temperature of the catalytic combustor 7 remains relatively low and the conversion efficiency remains inadequate, resulting in a probability where a portion of anode off-gas is discharged in unburned status. When this takes place, since unburned hydrogen remains at a concentration below the flammable lean-limit, no ignition occurs inside or outside the system, resulting in no fear of occurrence of deterioration in a safety of the system.

In subsequent step S62, the system controller 34 calculates the flow rate of anode off-gas depending upon an elapsed time interval from commencement of discharging anode off-gas in accordance with the selected anode off-gas supply pattern and, in step S64, the opening degree of the anode off-gas discharge valve 35 is adjusted so as to meet the calculated flow rate for thereby regulating the flow rate. In step S66, discrimination is made to find whether the elapsed time interval exceeds a given time interval (t2 in FIG. 6) and if the elapsed time interval exceeds the given time interval, then operation is routed back to step S62 to continue discharging of anode off-gas in accordance with the selected supply pattern.

In discrimination in step S66, if the elapsed time interval is found to exceed the given time interval, operation is routed to step S68 where discrimination is made to find whether the temperature of the catalytic combustor 7 detected by the temperature detector 32 exceeds the activating temperature. If the temperature of the catalytic combustor 7 is found to be less than the activating temperature, operation is waited in step S66.

At a timing where the temperature of the catalytic combustor 7 is found to exceed the activating temperature, since the catalytic combustor 7 has a sufficiently facilitated activity with a resultant extremely less probability in occurrence of unburned hydrogen being discharged, operation is routed to step S70 where anode off-gas is continuously discharged at a given flow rate of anode off-gas.

In subsequent step S72, operation is waited until the detected voltage level of the voltage detector 33 for detecting the output voltage of the fuel cell stack 3 reaches a value greater than the given voltage value. If the detected voltage level is found to exceed the given voltage value, operation is routed to step S74 wherein the anode off-gas discharge valve 35 is closed to interrupt the discharging of anode off-gas whereupon operation is restored to a given operating condition.

According to the third embodiment set forth above, due to the presence of control through which the fuel gas is transiently and incrementally supplied during the ignition period, the fuel gas is lively combusted followed by advancement of warm-up of the catalytic combustor 7 and even when remaining at the fuel gas concentration in the vicinity of a flammable limit, the fuel gas concentration can be lowered below the flammable lean-limit. In such case, the heat value of fuel gas increases, thereby enabling the ignition time interval to be shortened.

Also, on the contrary, depending upon a concentration incremental pattern that is preliminarily obtained during the ignition period, an incremental flow rate of air is transiently decremented from an initial value and the hydrogen average concentration in mixed gas during the ignition period is maintained within a given range while keeping anode off-gas at a fixed flow rate. In such case, since the heat value can be increased, the activation of the catalytic combustor 7 can be relatively rapidly performed.

INDUCTRIAL APPLICABILITY

According to the present invention, due to an ability wherein during an ignition time period wherein discrimination is made that a catalytic combustor is sufficiently activated at least from commencement of supplying mixed gas, a fuel gas concentration in mixed gas is controlled to remain within a given range whereupon, after discrimination is made that the catalytic combustor has been sufficiently activated, control is achieved so as to allow supply of mixed gas with a fuel gas concentration lying in a value outside the given range, operation can be achieved under an appropriate condition in dependence on a status of the catalytic combustor and, hence, there is an advantage in that a recovery efficiency of heat energy can be increased while avoiding the catalytic combustor from being largely sized in structure.

Also, there is no occurrence of flammable gas being exhausted to the outside of a system, resulting in an advantage of improvement in a safety and reliability.

The entire content of Japanese Application No. P2003-041147 with a filing date of Feb. 19, 2003 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

The invention claimed is:

1. A fuel cell system comprising:
   a fuel gas supply unit supplying fuel gas;
   an oxidant gas supply unit supplying oxidant gas;
   a fuel cell stack that generates electric power upon electrochemical reaction between the fuel gas and the oxidant gas;
   a catalytic combustor combusting mixed gas comprising an anode off-gas discharged from an anode of the fuel cell stack and a cathode off-gas discharged from an cathode of the fuel cell stack;
   an anode off-gas control valve supplying the anode off-gas to the catalytic combustor;
   a cathode off-gas control valve supplying the cathode off-gas to the catalytic combustor; and
   a controller operative to control the anode off-gas control valve and the cathode off-gas control valve such that at least during an ignition period until the catalytic combustor is discriminated to be sufficiently activated from commencement of supplying the mixed gas to the catalytic combustor, an average fuel gas concentration of the mixed gas is maintained in a given range whereas after the ignition period has been elapsed, the mixed gas is available to be supplied to the catalytic combustor even if the average fuel gas concentration deviates from the given range.

2. The fuel cell system according to claim 1, wherein the controller controls the anode off-gas control valve to allow the anode off-gas to be intermittently supplied to the catalytic combustor during the ignition period.

3. The fuel cell system according to claim 1, wherein the controller controls the cathode off-gas control valve to allow the cathode off-gas to be intermittently supplied to the catalytic combustor at an incremented flow rate during the ignition period.

4. The fuel cell system according to claim 1, wherein the controller controls the anode off-gas control valve to allow the anode off-gas to be supplied to the catalytic combustor at a transiently incremented flow rate during the ignition period.

5. The fuel cell system according to claim 1, wherein the controller controls the cathode off-gas control valve to allow the cathode off-gas to be supplied to the catalytic combustor at a transiently decremented flow rate during the ignition period.

6. The fuel cell system according to claim 1, wherein the controller controls the anode off-gas control valve to allow the anode off-gas to be supplied to the catalytic combustor to be maintained at the maximum concentration of fuel gas in the mixed gas lying in the given range during the ignition period.

7. The fuel cell system according to claim 1, wherein the given range is determined to exceed a fuel gas concentration greater than a value that causes a combustion temperature resulting from the mixed gas to reach an activating temperature of the catalytic combustor.

8. The fuel cell system according to claim 1, wherein the given range is determined to be lower than a fuel gas concentration forming a flammable limit of the mixed gas.

9. The fuel cell system according to claim 1, wherein the given range is determined to be greater than a fuel gas concentration at which a combustion temperature of the mixed gas reaches an activating temperature of the catalytic combustor and less than a fuel gas concentration forming a flammable limit of the mixed gas.

10. The fuel cell system according to claim 1, further comprising:
    a temperature detector detecting an operating temperature of the catalytic combustor to produce a detection signal indicative of a catalyst temperature lying at a given low level; and
    wherein the controller is responsive to the detection signal to open the anode off-gas control valve and to control the cathode off-gas control valve to allow the anode off-gas and the cathode off-gas to be introduced to the catalytic combustor to form the mixed gas therein at a given fuel concentration greater than a catalyst activation lower limit and less than a flammable limit.

11. The fuel cell system according to claim 10, further comprising:
    a temperature detector detecting a temperature of the anode off-gas expelled from the anode to provide an anode off-gas temperature signal;
    a pressure detector detecting a pressure of the anode off-gas expelled from the anode to provide an anode off-gas pressure signal; and wherein
    the controller is responsive to the anode off-gas temperature signal and the anode off-gas pressure signal to estimate a flow rate of the anode off-gas being expelled from the anode, to calculate a demanded flow rate of the cathode off-gas to be delivered through the cathode off-gas control valve based on an estimated result indicative of the flow rate of the anode off-gas, and to control the opening degree of the cathode off-gas control valve in response to a calculation result.

12. A fuel cell system comprising:
    a fuel gas supply unit supplying fuel gas;
    an oxidant gas supply unit supplying oxidant gas;
    a fuel cell stack having an anode, from which anode off-gas is expelled, and a cathode, from which cathode off-gas is expelled, that generate electric power upon electrochemical reaction between the fuel gas or the anode off-gas and the oxidant gas;
    a catalytic combustor combusting mixed gas comprises the fuel gas or the anode off-gas and the oxidant gas or the cathode off-gas;
    an anode off-gas control valve supplying at least one of the fuel gas and the anode off-gas to the catalytic combustor during an ignition period;
    a cathode off-gas control valve supplying at least one of the oxidant gas and the cathode off-gas to the catalytic combustor during the ignition period;

a controller operative to control the anode off-gas control valve and the cathode off-gas control valve such that at least during the ignition period until the catalytic combustor is discriminated to be sufficiently activated from commencement of supplying the mixed gas to the catalytic combustor, a fuel gas concentration of the mixed gas is maintained in a given range whereas after the ignition period has been elapsed, the mixed gas is available to be supplied to the catalytic combustor even if the fuel gas concentration deviates from the given range;

a temperature detector detecting an operating temperature of the catalytic combustor to produce a detection signal indicative of a catalyst temperature lying at a given low level;

wherein the controller is responsive to the detection signal to open the anode off-gas control valve and to control the cathode off-gas control valve to allow the anode off-gas and the cathode off-gas to be introduced to the catalytic combustor to form the mixed gas therein at a given fuel concentration greater than a catalyst activation lower limit and less than a flammable limit;

a temperature detector detecting a temperature of the anode off-gas expelled from the anode to provide an anode off-gas temperature signal;

a pressure detector detecting a pressure of the anode off-gas expelled from the anode to provide an anode off-gas pressure signal; and wherein the controller is responsive to the anode off-gas temperature signal and the anode off-gas pressure signal to estimate a flow rate of the anode off-gas being expelled from the anode, to calculate a demanded flow rate of the cathode off-gas to be delivered through the cathode off-gas control valve based on an estimated result indicative of the flow rate of the anode off-gas, and to control the opening degree of the cathode off-gas control valve in response to a calculation result;

wherein the controller stores an anode off-gas supply pattern indicative of the given fuel concentration, and is responsive to the estimated result indicative of the flow rate of the anode off-gas to select the anode off-gas supply pattern for controlling the flow rate of the anode off-gas control valve.

13. A fuel cell system comprising:
fuel gas supply means for supplying fuel gas;
oxidant gas supply means for supplying oxidant gas;
a fuel cell stack that generates electric power upon electrochemical reaction between the fuel gas and the oxidant gas;
catalytic combustion means for combusting mixed gas comprising an anode off-gas discharged from an anode of the fuel cell stack and a cathode off-gas discharged from a cathode of the fuel cell stack;
anode off-gas valve means for supplying the anode off-gas to the catalytic combustion means;
cathode off-gas valve means for supplying the cathode off-gas to the catalytic combustion means; and
control means for controlling the anode off-gas valve means and the cathode off-gas valve means such that at least during an ignition period until the catalytic combustion means is discriminated to be sufficiently activated from commencement of supplying the mixed gas to the catalytic combustion means, an average fuel gas concentration of the mixed gas is maintained in a given range whereas after the ignition period has been elapsed, the mixed gas is supplied to the catalytic combustion means even if the average fuel gas concentration deviates from the given range.

14. A method of operating a fuel cell system having a fuel gas supply unit for supplying fuel gas and an oxidant gas supply unit for supplying oxidant gas, the method comprising:
providing a fuel cell stack that generates electric power upon electrochemical reaction between the fuel gas and the oxidant gas;
providing a catalytic combustor that combusts mixed gas comprising an anode off-gas discharged from an anode of the fuel cell stack and a cathode off-gas discharged from a cathode of the fuel cell stack; and
controlling an average fuel gas concentration of the mixed gas to be supplied to the catalytic combustor such that at least during an ignition period until the catalytic combustor is discriminated to be sufficiently activated from commencement of supplying the mixed gas to the catalytic combustor, the average fuel gas concentration of the mixed gas is maintained in a given range whereas after the ignition period has been elapsed, the mixed gas is supplied to the catalytic combustor even if the fuel gas concentration deviates from the given range.

* * * * *